United States Patent [19]
Hansen et al.

[11] Patent Number: 5,714,861
[45] Date of Patent: *Feb. 3, 1998

[54] VARIABLE SPEED CONTROL FOR A HAND-HELD ELECTRIC POWER TOOL

[75] Inventors: James Edward Hansen, Oak Creek, Wis.; Jeffery L. Henderson, Somerville; Nathanael Sommer, Huntsville, both of Ala.

[73] Assignee: Eaton Corporation, Cleveland, Ohio

[*] Notice: The term of this patent shall not extend beyond the expiration date of Pat. No. 5,512,810.

[21] Appl. No.: 623,270

[22] Filed: Mar. 28, 1996

Related U.S. Application Data

[63] Continuation-in-part of Ser. No. 250,080, May 27, 1994, Pat. No. 5,512,810.

[51] Int. Cl.$^6$ .................................................. H02P 7/00
[52] U.S. Cl. ..................... 318/799; 388/820; 388/919; 388/937; 323/324
[58] Field of Search ........................ 318/799–802; 388/917–920, 937, 820; 323/324; 327/455, 457

[56] References Cited

U.S. PATENT DOCUMENTS

| | | | |
|---|---|---|---|
| 3,832,612 | 8/1974 | Woods | 319/788 |
| 3,897,595 | 7/1975 | Fearno | 318/212 |
| 3,936,708 | 2/1976 | Dummer | 318/249 |
| 4,031,458 | 6/1977 | Ichikawa | 323/36 |
| 4,052,624 | 10/1977 | Hamstra | 307/252 B |
| 4,157,491 | 6/1979 | Werner et al. | 618/798 |
| 4,158,796 | 6/1979 | Kosak et al. | 318/245 |
| 4,361,798 | 11/1982 | Tolmie, Jr. | 323/324 |
| 4,422,030 | 12/1983 | McAllise | 318/779 |
| 4,528,456 | 7/1985 | Harris | 307/31 |
| 4,703,248 | 10/1987 | Kühnemundt et al. | 323/300 |
| 4,914,327 | 4/1990 | Dekker | 307/632 |
| 5,247,230 | 9/1993 | Michaud | 318/17 |
| 5,512,810 | 4/1996 | Hansen et al. | 318/800 |

FOREIGN PATENT DOCUMENTS

| | | |
|---|---|---|
| 1434474 | 5/1976 | Germany. |
| 1442487 | 7/1976 | Germany. |
| 58-3583 A | 1/1983 | Japan. |

OTHER PUBLICATIONS

SCR Manual, General Electric Company, 1979, pp. 252–254.
General Electric Application Note No. 200.35, p. 8.

*Primary Examiner*—Brian Sircus
*Attorney, Agent, or Firm*—Quarles & Brady

[57] ABSTRACT

A power tool has a variable speed control circuit that comprises a user switch, a motor and a silicon controlled rectifier (SCR) connected in series between a pair of power supply terminals. A manually variable resistor is connected between a first electrode of the SCR and a circuit node. A capacitor is coupled between the circuit node and a second SCR electrode. A bleed-off resistor is connected between second electrode of the SCR and the circuit node to provide a path for discharging the capacitor when the user switch is open. A zener diode couples the circuit node to the SCR gate electrode. The circuit configuration ensures that the capacitor charges from substantially the same voltage level at the start of each half-cycle during which the SCR is to be turned on.

4 Claims, 1 Drawing Sheet

VARIABLE SPEED CONTROL FOR A HAND-HELD ELECTRIC POWER TOOL

This is a continuation-in-part of U.S. patent application Ser. No. 08/250,080 filed May 27, 1994 now U.S. Pat. No. 5,512,810.

BACKGROUND OF THE INVENTION

The present invention relates to variable speed controls for electric motors; and more particularly to such controls for regulating the speed of hand-held power tools which are driven by an electric motor.

Hand-held power tools, such as electric drills and drywall screwdrivers, utilize an electric motor to power a bit which either drills a hole or turns a screw. Such power tools often incorporate a trigger which is manually operated by the user of the tool with the speed of the motor being controlled by the degree to which the user presses the trigger. This allows the speed of the drill or the screw bit to be varied depending upon the particular application for the tool. For example, the speed of a drill bit can be controlled to correspond to the hardness of the material being drilled.

FIG. 1 shows a typical circuit used in previous hand-held power tools to control the speed of an electric motor 11. When switch 12 closes, capacitor 13 charges at an adjustable rate determined by the position of variable resistor 14 which is controlled by the user. When the voltage across capacitor 13 reaches a threshold potential of diac 15, that device fires becoming conductive and applying a trigger potential to the gate electrode G of a triac 16. When triggered, the triac 16 becomes conductive applying electricity from source 18 to the motor 11. Depending upon the charge rate of capacitor 13, the triac 16 turns on at different phase angles during each half-cycle of the alternating current supplied by source 18. The sooner the triac turns on during each half-cycle, the greater the magnitude of current applied to the motor 11 and thus the faster the motor turns.

This basic motor speed control circuit 10 has a drawback with respect to its use in hand-held power tools. Assuming that the power tool has been turned off for a relatively long time, the capacitor 13 will have been fully discharged due to current leakage through the diac 15 and triac 16. In addition, the capacitor 13 has intrinsic resistance which provides a current leakage path. As a result, the capacitor 13 will begin charging from zero volts when the switch is closed and continues to charge until reaching the firing potential of the diac 15. When conventional diacs fire, their conduction characteristic is such that all of the voltage across the capacitor 13 is not discharged. For example, a typical diac fires at 30-40 volts and once conductive, the voltage across the capacitor 13 drops to approximately 20 volts where it remains through the rest of that half-cycle of the alternating supply voltage.

When the polarity of the alternating supply voltage reverses during the next half-cycle, the capacitor does not begin charging from zero volts, but rather from the residual voltage of opposite polarity from the previous half-cycle. For example, at the end of a positive half-cycle, a positive 20 volts may remain across the capacitor 13. When the supply voltage polarity reverses during a negative half-cycle, the residual positive 20 volt charge on the capacitor first must be overcome before the capacitor can charge to a negative voltage level at which the diac 15 fires. Thus, after the first half-cycle, a longer time is required between the zero crossing of the alternating supply voltage from source 18 and the triggering of the triac 16.

Because the initial current through the motor may be significantly greater than desired or expected by the user, the speed of the motor may increase abruptly when first turned on. Such an abrupt jump in speed can cause the power tool to "kick" in the user's hand. When the tool kicks, the drill bit may move away from the desired location for the hole or the screwdriver bit may jump out of the grooves in the head of the screw.

A similar kick can occur when the power tool is rapidly cycled off and on. As noted previously, current leakage in various components when the power tool is turned off slowly discharges any voltage remaining across capacitor 13. Normally, this leakage current is very small and the discharge occurs over a relatively long period of time. Therefore, rapid cycling of the power tool between off and on, as frequently occurs with a power tool used to drive dry-wall screws, can take place before residual voltage across capacitor 13 has discharged completely.

The amount of residual capacitor voltage is dependent upon the point in the half-cycle of the alternating supply voltage at which the switch 12 was opened. In the worst case situation, the switch 12 is opened just before the voltage across the capacitor 13 has reached the firing potential of diac 15. In this situation if the switch 12 then is closed a very short time later during a half-cycle having the same polarity as the half-cycle when the switch opened, a very short amount of time will elapse before the voltage across capacitor 13 reaches the firing potential of the diac. Thus, the diac may fire almost immediately upon closure of switch 12 causing the triac 16 to apply a relatively large magnitude of current through motor 11 during that half-cycle, even though the user has placed variable resistor 14 in a position which should normally apply a much smaller magnitude of current to the motor. During subsequent half-cycles of the supply voltage that smaller intended current level will be applied. Thus, the motor possibly can start at a relatively high initial torque before it subsequently is powered at a desired speed during the next half-cycle of the supply voltage. Such operation in this worst case creates a very abrupt change in the torque of the motor which also causes jumping of the drill bit or screwdriver bit. This abrupt change in the applied motor current is very undesirable in hand-held power tools.

The power tool market is very cost-competitive and sophisticated electronic circuit solutions to these problems may have an adverse impact on the cost of the power tool. Therefore, it is highly desirable to solve problems with a minimal number of additional components that are relatively inexpensive.

SUMMARY OF THE INVENTION

An object of the present invention is to provide a variable speed control circuit for an electric motor driven hand-held power tool which alleviates the motor kick upon start-up.

Another object is to provide a solution to the motor kick problem which requires a minimal number of additional components and additional components which are relatively inexpensive, so that the solution will not increase the cost of the power tool significantly.

These objectives are fulfilled in a hand-held power tool that has a variable speed control circuit which comprises a switch, motor and a silicon controlled rectifier (SCR) connected in series between a pair of power terminals. The SCR has first and second electrodes with a conduction path therebetween connected in series with the motor and the switch. Conductivity of the conduction path is controlled by current applied to a gate electrode of the SCR.

A zener diode has an anode connected to the gate electrode of the SCR and a cathode connected to a trigger node of the circuit. A manually variable resistor is connected between the first electrode of the thyristor and the trigger node. A capacitor is connected between the second electrode of the thyristor and the trigger node. A bleed-off resistor is coupled between the second electrode and the trigger node to provide a path for discharging the capacitor when the switch is open. This path ensures that the capacitor will start charging from substantially zero volts when the power tool initially turned on. A diode is connected across the charging capacitor so that the diode is forward biased to discharge the capacitor when the SCR is reverse biased. This results in the capacitor charging from substantially the same voltage level during every half-cycle of the supply voltage in which the thyristor will be triggered.

DESCRIPTION OF THE PREFERRED EMBODIMENT

Figure 1:
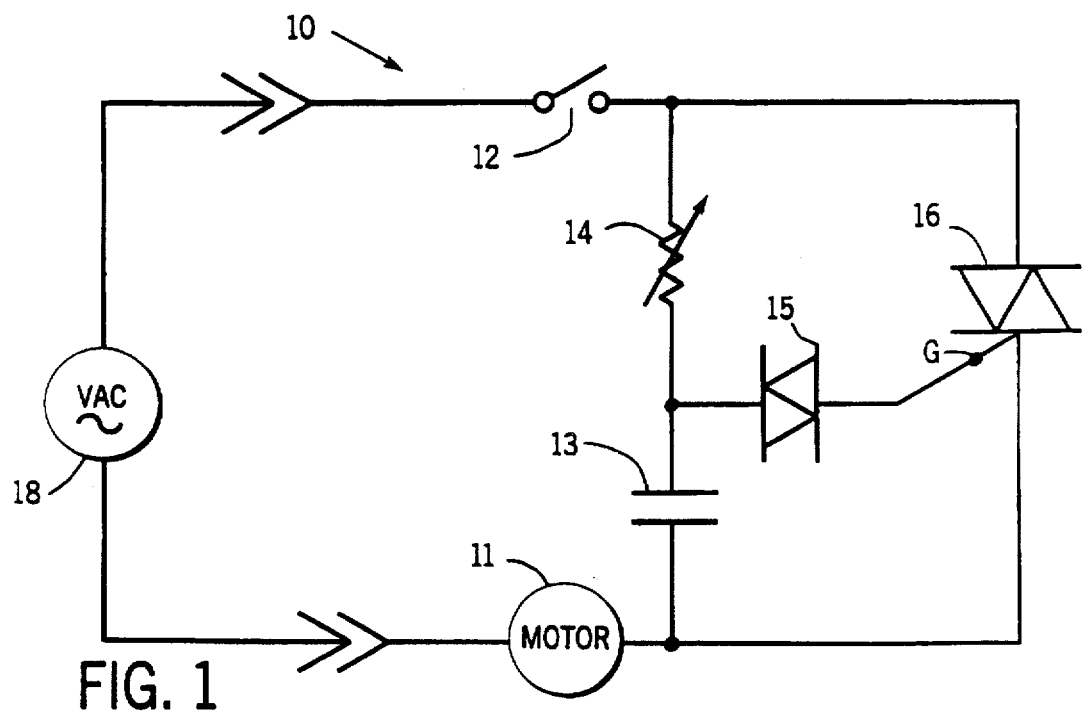
FIG. 1 is a schematic diagram of a prior art variable speed control for an electric power tool.
Figure 2:
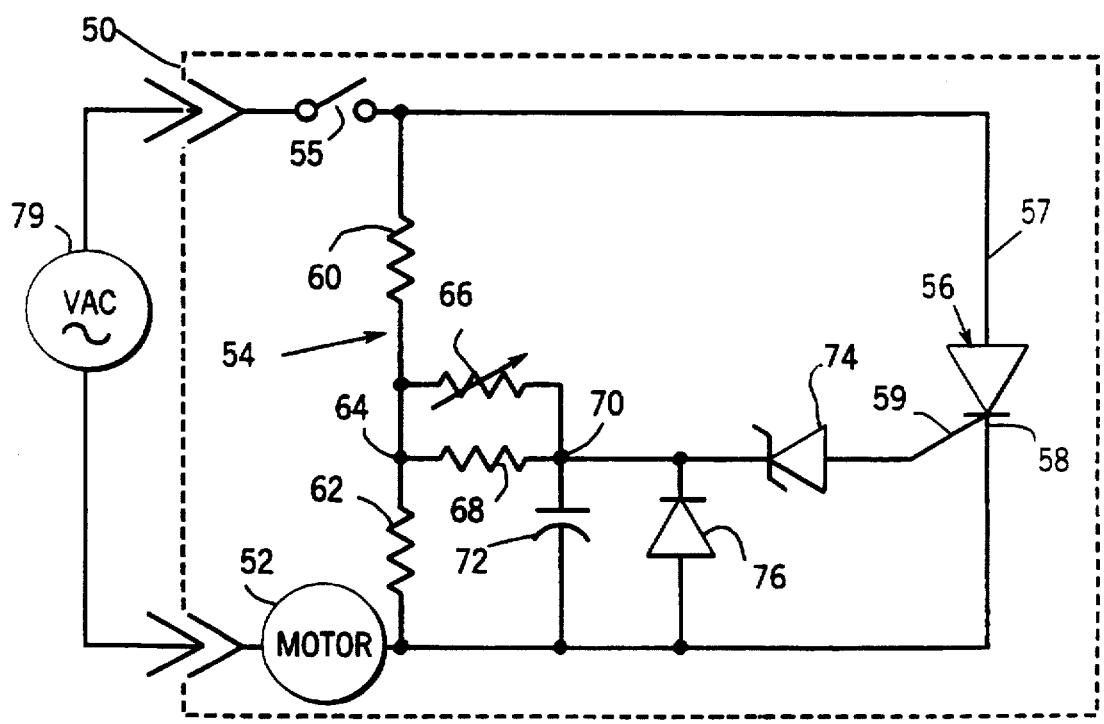
FIG. 2 is a schematic diagram of a control circuit according to the present invention for varying the speed of an electric motor of a hand-held power tool.

With reference to FIG. 2, a hand-held power tool 50 is driven by an electric motor 52 which is controlled by a variable speed control circuit 54. Control circuit 54 includes a switch 55 that is manually operated by the user of the power tool to turn on and off the motor 52. The switch 55 is coupled electrically to the motor 52 by a sensitive gate type silicon controlled rectifier (SCR) 56 having an anode 57 connected to the switch and a cathode 58 connected to one terminal of the motor. The SCR 56 also has a gate, or control, electrode 59, which when driven by a low current determines the conductivity in the SCR between the anode 57 and the cathode 58.

A voltage divider, formed by first and second resistors 60 and 62 in series, is connected directly across the anode and cathode of SCR 56. As used herein, the term "connected directly" refers to an electrical connection provided by a conductor which has negligible resistance and reactance. A first node 64 between the first and second resistors 60 and 62 is coupled to a second node 70 by a variable resistor 66 in parallel with a fixed trimmer resistor 68. A capacitor 72 is connected directly between the second node 70 and the SCR cathode 58. A standard diode 76 has an anode connected to the cathode of the SCR 56 and the cathode of diode 76 is connected directly to the second node 70.

A zener diode 74 couples the second node 70 to the gate electrode 59 of SCR 56. Specifically, the cathode of the zener diode 74 is connected to the second node 70 and the zener diode anode is connected to the SCR gate electrode 59. In a typical application where the tool is powered by 110 VAC from source 79 the zener diode has a breakdown potential of 30 volts, for example.

The operation of the half-wave control circuit 54 avoids the power tool kick problems produced by prior speed control circuits. Assume that when the user closes switch 55, the alternating voltage from the source 79 is in a positive half-cycle. This results in the voltage at the second node 70 increasing in a positive direction. Statements herein regarding the voltage level and changes in voltage at the second node 70 and across capacitor 72 are with reference to the cathode 58 of SCR 56. The firing of the SCR 56 is not dependent upon its trigger characteristic, but rather is dependent upon the breakdown potential of zener diode 74. When the positive voltage at the second node 70 reaches that breakdown potential, the zener diode 74 begins conducting current from the second node into the gate electrode 59 of the SCR, thereby discharging the positive charge on the capacitor. This places SCR 56 in the conductive state sending current from source 79 to the motor 52. As is characteristic of thyristors, then SCR 56 remains conductive until the alternating current goes to zero, at which point it will turn off and remain off until triggered again.

When the SCR 56 turns off, the residual voltage across capacitor 72 results in the second node 70 being at a positive voltage level due to the characteristics of the zener diode. Specifically, the breakdown threshold of the zener diode 74 leaves the second node 70 at a significant residual voltage level (e.g. 30 volts) when the SCR turns off.

During the next, or negative, half-cycle of the supply voltage, the SCR 56 will be reversed biased wherein the anode is at a negative potential with respect to the cathode 58. This reversing of the supply line voltage results in current flowing through diode 76 and resistors 60, 66 and 68. The residual positive voltage that remained across capacitor 72 will be reduced to a very small negative voltage corresponding to the forward voltage drop across diode 76. This resultant voltage level typically will be less than one volt, which for practical purposes is equivalent to the zero volt level that was across capacitor 72 when the user initially closed switch 55. The SCR 56 can not turn on during negative half-cycles since it is reversed biased. At the completion of the negative half-cycle of the supply line voltage, node 70 will have a negative potential between zero and one volt.

Thereafter, the supply line voltage once again goes through a positive half-cycle and the capacitor 72 begins charging from that negligible negative voltage level. The charging continues until the voltage at the second node 70 reaches a positive level equal to the breakdown potential of the zener diode 74 at which point the SCR 56 will once again be turned on. The amount of time that it takes for the second node 70 to reach the breakdown potential of zener diode 74 practically will be the same during each positive half-cycle. Therefore, by eliminating the residual charge on the capacitor 72 during negative half-cycles of the supply line voltage, the present control circuit 54 has alleviated one cause of the motor speed jump which occurred in previous control circuits.

When the user opens switch 55 to turn off the power tool 50, the residual charge on capacitor 72 is discharged through resistors 62, 66 and 68 in a relatively rapid manner. Thus, by providing bleed-off resistor 62, the capacitor has a very high likelihood of charging from a zero voltage level each time switch 55 closes, even in instances when the interval between opening and closing the switch is relatively short.

By using a zener diode to trigger the SCR and a diode 76 to remove residual charge from capacitor 72 during each negative half-cycle of the supply line voltage, and by providing bleed-off resistor 62 to create a discharge path when the power tool is turned off, the half-wave variable speed control circuit 54 has alleviated motor start-up kick problems encountered in previous control circuits.

We claim:

1. In a hand-held power tool having an electric motor and a pair of power terminals for connection to a source of alternating electricity, a variable speed control circuit comprising:

a switch which is operable by a user of the power tool;

a silicon controlled rectifier having gate electrode, a first electrode, a second electrode and a conduction path between the first and second electrodes with conductivity of the conduction path controlled by current applied to the gate electrode, wherein the conduction path, said switch and the electric motor are connected in series between the pair of power terminals;

a voltage divider connected across the first and second electrodes of said silicon controlled rectifier, and consisting of first and second resistors connected in series with a first node therebetween;

a second node;

a variable resistor manually operated by the user and connected between the first node and said second node;

a capacitor connected between the second electrode of said silicon controlled rectifier and said second node;

a diode connected between said second node and the second electrode of said silicon controlled rectifier, and being forward biased when said silicon controlled rectifier is reverse biased; and a zener diode having an anode connected directly to the gate electrode of said silicon controlled rectifier, and having a cathode connected directly to said second node.

2. The hand-held power tool as recited in claim 1 wherein the variable speed control circuit further comprises trimmer resistor connected in parallel across said variable resistor wherein resistance of said trimmer resistor can be varied to adjust a time constant of an RC circuit formed by said variable resistor and said capacitor.

3. In a hand-held power tool having an electric motor and a pair of power terminals for connection to a source of alternating electricity, a variable speed control circuit comprising:

a switch which is operable by a user of the power tool;

a silicon controlled rectifier having gate electrode, a cathode, an anode and a conduction path between the anode and cathode with conductivity of the conduction path controlled by current applied to the gate electrode, wherein the conduction path, said switch and the electric motor are connected in series between the pair of power terminals;

a voltage divider connected directly across the anode and cathode of said silicon controlled rectifier, and consisting of first and second resistors connected directly in series with a first node therebetween;

a second node;

a variable resistor manually operated by the user and connected directly between the first node and said second node;

a capacitor connected directly between the cathode of said silicon controlled rectifier and said second node;

a diode connected directly between said second node and the cathode of said silicon controlled rectifier, and being forward biased when said silicon controlled rectifier is reverse biased; and a zener diode having an anode connected directly to the gate electrode of said silicon controlled rectifier, and having a cathode connected directly to said second node.

4. The hand-held power tool as recited in claim 3 wherein the variable speed control circuit further comprises trimmer resistor connected in parallel across said variable resistor wherein resistance of said trimmer resistor can be varied to adjust a time constant of an RC circuit formed by said variable resistor and said capacitor.

* * * * *